United States Patent
Sanchez Vega et al.

(10) Patent No.: US 9,544,201 B2
(45) Date of Patent: Jan. 10, 2017

(54) QUALITY OF EXPERIENCE IN COMMUNICATION NETWORKS

(71) Applicant: Telefonaktiebolaget L M Ericsson (publ), Stockholm (SE)

(72) Inventors: Veronica Sanchez Vega, Madrid (ES); Miguel Angel Muñoz De La Torre Alonso, Madrid (ES); John Woods, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/779,119

(22) PCT Filed: Mar. 27, 2013

(86) PCT No.: PCT/EP2013/056535
§ 371 (c)(1),
(2) Date: Sep. 22, 2015

(87) PCT Pub. No.: WO2014/154263
PCT Pub. Date: Oct. 2, 2014

(65) Prior Publication Data
US 2016/0050124 A1 Feb. 18, 2016

(51) Int. Cl.
*H04L 12/24* (2006.01)
*H04M 15/00* (2006.01)
(Continued)

(52) U.S. Cl.
CPC ....... *H04L 41/5025* (2013.01); *H04L 41/0893* (2013.01); *H04L 41/5067* (2013.01);
(Continued)

(58) Field of Classification Search
None
See application file for complete search history.

(56) References Cited

U.S. PATENT DOCUMENTS

2011/0299395 A1* 12/2011 Mariblanca Nieves ............... H04L 12/5695 370/235
2013/0142043 A1* 6/2013 Tapia ............... H04W 28/0268 370/230
(Continued)

FOREIGN PATENT DOCUMENTS

CN  EP 2398262 A1 * 12/2011 ......... H04L 12/6418
WO  WO 00/33511 A1  6/2000
WO  WO 2011/057672 A1  5/2011

OTHER PUBLICATIONS

International Search Report, Application No. PCT/EP2013/056535, Nov. 7, 2013.
(Continued)

*Primary Examiner* — Marisol Figueroa
(74) *Attorney, Agent, or Firm* — Myers Bigel, P.A.

(57) ABSTRACT

A network entity for use in a communication network. The network entity including a processing resource that is configured to obtain information indicative of a quality of experience on a user terminal in communication with the communication network; and to control the communication to the user terminal based on the obtained information indicative of a quality of experience.

20 Claims, 4 Drawing Sheets (51) Int. Cl.
*H04W 72/04* (2009.01)
*H04W 72/08* (2009.01)
*H04L 12/14* (2006.01)

(52) U.S. Cl.
CPC ... *H04M 15/8016* (2013.01); *H04W 72/0493* (2013.01); *H04W 72/085* (2013.01); *H04L 12/1407* (2013.01); *H04L 41/509* (2013.01); *H04L 41/5087* (2013.01); *H04M 15/66* (2013.01)

(56) References Cited

U.S. PATENT DOCUMENTS

2015/0085662 A1* 3/2015 Hu .................... H04L 12/1407
370/235
2015/0289167 A1* 10/2015 Alex .................. H04W 28/24
370/329

OTHER PUBLICATIONS

3GPP, Technical Specification, "3rd Generation Partnership Project; Technical Specification Group Services and System Aspects; Study on Policy solutions and enhancements (Release 11)", 3GPP TR 23.813 V11.0.0 (Jun. 2011), 41 pp.
3GPP, Technical Specification, "3rd Generation Partnership Project; Technical Specification Group Core Network and Terminals; Policy and Charging Control (PCC); Reference points (Release 12)", 3GPP TS 29.212 V12.0.0 (Mar. 2013), 198 pp.
3GPP, Technical Specification, "3rd Generation Partnership Project; Technical Specification Group Services and System Aspects; Policy and charging control architecture (Release 12)", 3GPP TS 23.203 V12.0.0 (Mar. 2013), 183 pp.

* cited by examiner

QUALITY OF EXPERIENCE IN COMMUNICATION NETWORKS

CROSS REFERENCE TO RELATED APPLICATION

This application is a 35 U.S.C. §371 national stage application of PCT International Application No. PCT/EP2013/056535, filed on Mar. 27, 2013, the disclosure and content of which is incorporated by reference herein in its entirety. The above-referenced PCT International Application was published in the English language as International Publication No. WO 2014/154263 A1 on Oct. 2, 2014.

TECHNICAL FIELD

The present invention relates to network entities for use in a communication network. Specifically, the present invention relates to network entities involved in controlling communication to a user terminal based on information indicative of a quality of experience. The present invention also relates to a corresponding system, methods of operating the network entities and the system, and to corresponding computer programs and computer program products storing such computer programs.

BACKGROUND

Modern communication networks have evolved to handle various kinds of data. For example, a telecommunication network in the past was primarily designed for handling voice communication. In this way, a major use of the public switched telephone network (PSTN) was to convey voice signals over a switched connection from one terminal to another. Since the network provided a dedicated connection between terminals the quality of experience (QoE) to the users was generally good.

With the advent of packet switched communication networks, additional consideration had to be made when "real-time" data was communicated. Such "real-time" data include for example data packets involved in telephony over the internet protocol (IP, IP-telephony). Since the users' voices are encoded into digital data and this data being communicated in packets, it cannot be taken for granted that the packets arrive at the destination in time or in the right order. If—for example—packets are delayed, also the voice output is delayed, which in turn affects the quality of experience to a user. It is to be noted, however, that delay is certainly not the only factor affecting QoE, and relevant factors also include disruption of data, loss of data, etc.

The considerations may become more complex in conjunction of more "data-intense" communication, such as video telephony, multimedia streaming, web-based television and the like. Further, also the communication of measurement data, control data, etc. involved in the functional aspects of networks and applications run over networks may be sensitive to QoE, since for example—an application may severely suffer if required control data arrives too late.

As regards existing communication networks, the case of modern telecommunication networks of 3GPP-, LTE- or a further generation type are certainly of interest. These networks are capable of communicating large amounts of data so that also applications such as video-telephony and multimedia streaming became possible even to wireless, mobile devices (mobile telephones, smart phones, tablet and other portable personal computers, and the like).

However, existing solutions do not consider the QoE when managing and/or controlling communication toward a user terminal. Moreover, there is no current mechanism in 3GPP type implementations that monitors and ensures a certain end user QoE. Therefore, there is a need for improvement in order to allow for an enhanced QoE at the side of the user terminals.

SUMMARY

The above objects and mentioned problems are solved by the subject-matter of the independent claims. Preferred embodiments are described in the dependent claims.

An embodiment of the present invention is a network entity for use in a communication network, the network entity comprising a processing resource that is configured to obtain information indicative of a quality of experience on a user terminal in communication with the communication network; and to control the communication to the user terminal based on the obtained information indicative of a quality of experience.

Another embodiment of the present invention is a network entity for use in a communication network, the network entity comprising a processing resource that is configured to measure information indicative of a quality of experience on a user terminal in communication with the communication network; and to report the information indicative of a quality of experience to a further network entity for controlling the communication to the user terminal based on the obtained information indicative of a quality of experience.

Another embodiment of the present invention is a communication network comprising a network entity according to any one of the entity embodiments of the present invention.

Another embodiment of the present invention is a method of operating a network entity for use in a communication network, the method comprising the steps of obtaining information indicative of a quality of experience on a user terminal in communication with the communication network, and controlling the communication to the user terminal based on the obtained information indicative of a quality of experience.

Another embodiment of the present invention is a method of operating a network entity for use in a communication network, the method comprising the steps of measuring information indicative of a quality of experience on a user terminal in communication with the communication network, and reporting the information indicative of a quality of experience to a further network entity for controlling the communication to the user terminal based on the obtained information indicative of a quality of experience.

According to further embodiments of the present invention, a computer program and a computer program product storing this program are provided. The computer program comprises code that can implement or help implementing any entity or any method of the disclosed embodiments.

BRIEF DESCRIPTION OF THE DRAWINGS

Embodiments of the present invention, which are presented for better understanding the inventive concepts but which are not be seen as limiting the invention, will now be described with reference to the Figures in which.

DETAILED DESCRIPTION

Figure 1A:
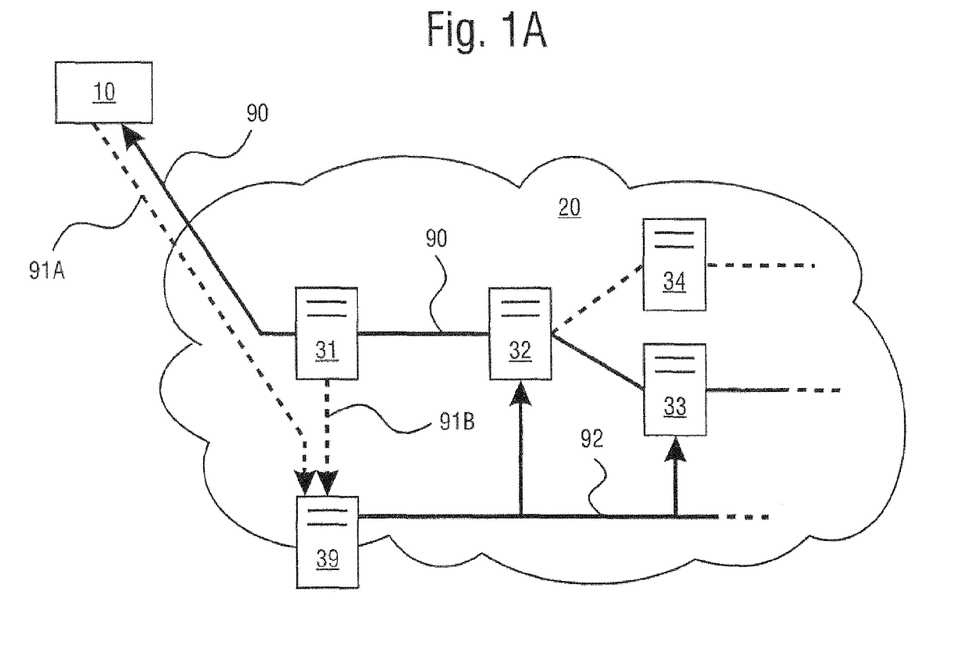
FIGS. 1A and 1B show schematic views of system implementations according to embodiments of the present invention.

FIG. 1A shows a schematic view of a system implementation according to an embodiment of the present invention. The Figure also describes the entities involved according to corresponding further embodiments of the present invention.

A user terminal 10 receives communication 90 from a network 20. The user terminal 10 is for example any one of a mobile phone, smart phone, IP telephone, tablet computer, personal digital assistant (PDA), personal computer (PC), notebook PC, television set, and the like. The network 20 is a communication network such as a telecommunication network along one or more of a 3GPP-, LTE-, 3G-, 4G- or a further generation-standard and type, the internet, a local area network (LAN), a wide area network (WAN), a corporate network, a wireless network, and the like.

The communication 90 toward the user terminal 10 comprises communication that is subject to QoE. In a way, this communication and/or the quality properties of this communication as received on the user terminal 10 influences the experience by a user. Examples include real-time communication during which the communicated data relate to telephony, video telephony, video conferencing, multimedia streaming, web-based television, measurement data, control input data (feedback), control (output) data, etc. In general, the actual level QoE of the communication may determine whether or not the communication is performed in an acceptable fashion or, in an opposite case, the communication cannot be considered as being fulfilling the requirements.

Network entities 31, 32, 33, and 24 may be involved in the network 20 with the communication 90. In a way, one or more of these entities may be in a communication path toward the user terminal 10. These entities may be nodes, switches, servers, etc. that handle the communication. In the example shown in FIG. 1A, a data source beyond entity 33 may be the actual originator of the data and communication. For example, this may be a video content server that provides a video stream as communication 90 to the terminal 10 via the entities 33, 32, and 31. There may be also alternative communication paths and routes, so that a part of the communication is also handled by entity 34.

According to embodiments of the present invention, a network entity 39 is provided, comprising a processing resource that is configured to obtain information 91A and/or 91B that is indicative of a quality of experience (QoE) on the user terminal 10 that is a destination of communication 90 from and via the network 20. The processing resource of entity 39 is further configured to control the communication to the user terminal 10 based on the obtained information indicative of a quality of experience. Specifically, entity 39 provides control 92 to entities in the communication path so as to control parameters of communication 90.

In this way, it is rendered possible to control the communication 90 based on the QoE as experienced on the user terminal 10. It is to be noted that the information that is indicative of QoE can be either retrieved as 91A from the user terminal 10 and/or as 91B from entity 31 in the communication path toward the user terminal. An example for 91A is that the user terminal 10 has functionality to measure the QoE and/or receive user input concerning feedback on the actual QoE. So, the user terminal 10 may, for example, determine a rate of lost/delayed data packets and/or receive a user input on sufficient and/or insufficient quality. In this way, the user terminal 10 is able to provide the information 91A to entity 39. Examples for 91B are given in greater detail in conjunction with the other embodiments of the present invention.

For example, a quality of service (QoS)—the service being the one provided by the network 20 and thus by the corresponding entities involved (31, etc.)—can be controlled based on the user terminal's 10 QoE. Following this example, the QoS can be increased if the QoE is low and, conversely, the QoS can be maintained or lowered if QoE is sufficient or more than enough. Particularly, in the latter case, the QoS can be controlled so that unnecessary efforts are avoided. The QoS can be as high as necessary and—at the same time—as low as possible. This may contribute in substantially optimizing the use of involved network, communication, processing, and energy resources.

Figure 1B:
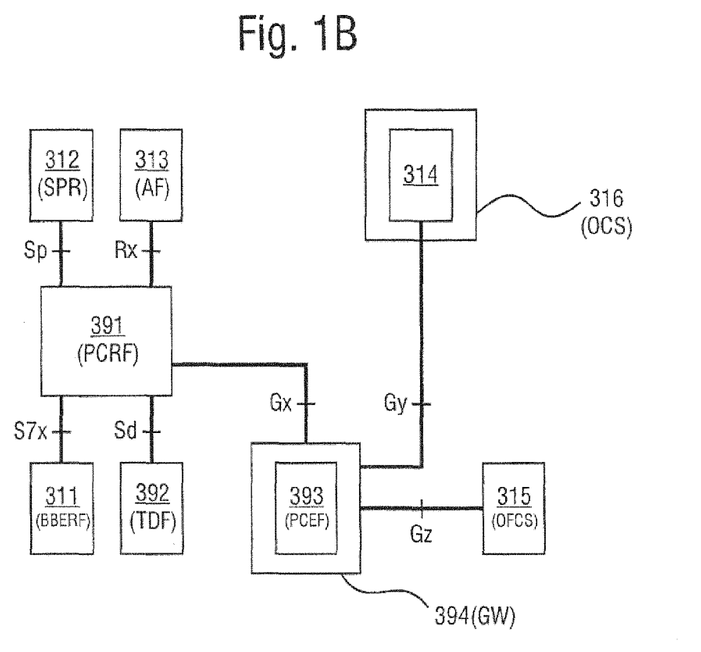

FIG. 1B shows a schematic view of another system implementation according to another embodiment of the present invention. The Figure again also describes the entities involved according to corresponding further embodiments of the present invention.

In line with a modern type telecommunication network, a policy and charging control (PCC) architecture permits to integrate both policy and charging control. The architecture that supports policy and charging control functionality is also schematically depicted in FIG. 1B. Related support can also be taken from $3^{rd}$ Generation Partnership Project (3GPP) Technical Specification (TS) "23.203", which specifies the PCC functionality for evolved 3GPP packet switched domain, including both 3GPP accesses (GERAN/UTRAN/E-UTRAN) and non-3GPP accesses.

In the following, this PCC policy and charging control architecture is explained. A Gx reference point is defined in 3GPP TS "29.212" and lies between a policy and charging rule function (PCRF) 391 and a policy and charging enforcement function (PCEF) 393. The Gx reference point is used for provisioning and removal of PCC rules from the PCRF 391 to the PCEF 393 and the transmission of traffic plane events from the PCEF 393 to the PCRF 391. The Gx reference point can be used for charging control, policy control or both. It is to be noted that the Gx reference point is based on Diameter protocol (as defined in RFC 3588).

DPI (Deep Packet Inspection) technology can support packet inspection and service classification, which consists on IP packets classified according to a configured tree of rules so that they are assigned to a particular service session. Once the packets have been classified into services, different enforcement actions can be done on a per service basis. In this way, the communication can be attributed to a particular service, so that one can also define the aforementioned quality of experience and quality of service as, respectively, a service-QoE and service-QoS.

A traffic detection function (TDF) 392 may be implemented in the network and may follow, for example, the implementation of 3GPP TR 23.813 that standardizes a DPI for 3GPP Release 11. The TDF 392 can be either stand-alone or collocated with PCEF 393. A reference point Sd can be defined between the a standalone TDF 393 and the PCRF 391. In the collocated case reference point Gx would apply.

The PCC architecture in 3GPP networks allows the operator to enforce a certain QoS both on a per user and on a per service basis. However, enforcing the QoS in the network does not directly map to a good/bad quality as perceived from end user perspective, which will be the final objective once QoE is considered.

According to a general aspect of the present invention, a network is deployed with "intelligence" in order to measure—possibly in real time—one or more figure(s) on QoE. Such information indicative of QoE can be in the form of key performance indicators (KPIs). This measurement can, according to an embodiment, take place in the PCEF 393 (e.g. as a locally activated measurement). In such an embodiment, the entity 31 as described in conjunction with FIG. 1A may have the functionality of the PCEF 393 of FIG. 1B. Further functionalities may be involved in a 3GPP PCC architecture/implementation, such as a measurement request from a policy and charging rules function (PCRF) 391 to the PCEF 393, when the measurement takes place in the PCEF 393 for generating and sending a corresponding measurement report from the PCEF 393 to PCRF 391.

As already mentioned, video services (such as videotelephony, -streaming, or -conferencing) may well serve as an example. In such a situation a real time monitoring of video QoE in the PCEF node could be performed by means of employing e.g. a GGSN/PGW (GPRS Gateway Support Node/Packet Data Network Gateway) or the standalone TDF 392. The measurement could be implemented either in continuous fashion or only upon the occurrence of specific events. Such a specific event may be triggered after changes in network QoS parameters during video transmission take place. This can be effected in order to verify that certain network QoS parameters they have actually worked. In this way, a dynamic feedback mechanism can be provided to ensure quality, as compared to a static set up at the start of video streaming. The measurement of QoE KPIs can be identified as a figure for real quality and its monitoring allows ensuring end user QoE in case it changes.

In general terms, such "intelligence" could be provided to customers (network users, subscribers) as part of a specific service or an "add-on" to their data plan. In this way, a network operator can provide the respective functionality to its users as a service to maximize the perceived value of their data plan within the boundaries of their subscription.

The remaining entities and functionalities shown in FIG. 1B are all only of supportive character implying that they can be readily be replaced or dispensed with in line with an actual implementation. In any way, these remaining entities as shown in FIG. 1B are a subscriber profile repository (SPR) database 312, an application function (AF) 313, an online charging system (OCS) 316 with a service data flow based credit control 314, an offline charging system (OFCS) 315, a gateway (GW) 394, and a BBERF (Bearer Binding and Event Reporting Function) 311.

A possible procedure is now described in terms of a more detailed embodiment of the present invention. A measurement activation and configuration covers both the activation and the configuration of QoE measurement functionality from PCRF 391. This activation can be triggered when a certain condition is met, such as detecting the presence of specific subscription data, e.g. when a user buys a QoE service bundle or when user is a "premium" user. Related information can be obtained from the PCRF 391 by referring to a subscriber profile repository (SPR) database 312 maintaining user profile.

This may take place typically at user session creation (internet protocol connectivity access network (IP-CAN) session establishment) or during a user session. In the latter case, a user may (spontaneously) decide to opt for a guaranteed QoE and may thus decide to obtain (buy) QoE service bundle, which—in turn—causes the SPR 312 to pushed for the respective control. The activation/configuration may also be triggered when network QoS parameters are changed or other conditions trigger this functionality (e.g. when a certain service starts, such as video streaming, a certain service provider gets involved (service source), or only for non roaming users or during the time when certain time of day (ToD) conditions are met, such as weekends.

Further, information can be exchanged between PCRF 391 and PCEF 393 so as to instruct to measure specific QoE KPI(s), to adapt a given reporting periodicity, to convey specific QoE threshold values indicating when to report, etc. In an exemplary measurement and reporting stage, the PCRF 391 can instruct accordingly the PCEF 393 so that QoE measurement reports will be sent, e.g. periodically or only when a measured QoE goes out of bounds. This may involve, respectively, a configuration of the PCEF 393 with a periodicity or a control by PCRF 391 or the configuration of thresholds in the PCEF 393 by the PCRF 391.

Once suitable information indicative of the QoS, e.g. in the form of the above measurement reports, control of the communication to the user terminal can take place. This control can be effected by means of one or more enforcement action(s) as described below. Based on QoE measurements received from PCEF 393, the PCRF 391 can communicate the PCEF 393 what enforcement action to apply. One enforcement action can be to dynamically update the network QoS. In case the measured QoE is low, the PCRF 391 could trigger an upgrade to network QoS. On the contrary, when measured QoE is higher than necessary, it would also be possible to downgrade the network QoS in order to save network resources. Additionally, in order to avoid too frequent network QoS changes (ping-pang effect), a certain hysteresis can be applied.

However, also other enforcement actions are possible, like codec adaptation (e.g. for a video service, to modify the video codec from a low bit rate codec to a higher bit rate one in order to improve QoE for that particular subscriber) or modification of access network selection or cell reselection policies (e.g. in order to improve the QoE for a particular subscriber, the network can trigger a cell reselection from UTRAN to a WIFI access which can provide the required QoS). Another option in case the measured QoE is highly degraded is to trigger an alarm indicating the source of the problem (e.g. QoE degraded for uplink traffic, but not for downlink traffic) so that an operator can take the appropriate action.

As already mentioned, a collocated implementation is one variant in which the TDF 392 is collocated with the PCEF 393, so that the Gx reference point applies. Such an implementation may apply to a 3GPP Release 11 compliant TDF node collocated with the PCEF node (e.g. GGSN or PGW with DPI capabilities). Additional reference is made in the context of this variant to the FIG. 2B showing a schematic view of a procedure carried out amongst involved entities. Specifically for the TDF collocated implementation an Gx event trigger "QOE_MEASUREMENT_REPORT" can be involved.

In this collocated variant QoE measurement activation and configuration can start at user session establishment, when the PCEF 393 can convey to the PCRF 391 a subscriber identity (international mobile subscriber identity=IMSI or mobile station integrated services digital network=MSISDN). Based on this information, the PCRF 391 can retrieve the subscription data from SPR database 312. Based on subscription data and also on other dynamic information (roaming status, service start condition, ToD conditions, etc), the PCRF 391 can decide to activate/configure QoE measurement at PCEF 393. As shown in FIG. 2B, such a measurement activation could be based on a Gx event trigger (exemplary denomination "QOE_MEASUREMENT_REPORT"), subscribed from PCRF 391 to PCEF 393 dynamically during the session.

The QoE measurement configuration could be similar to Gx usage monitoring, by extending PCC rules with QoE monitoring (QoE-Monitoring-Key). In order to configure QoE measurements from PCRF 391, an attribute value pair (AVP) can be employed (QoE-measurement-information AVP), that can include parameters like reporting periodicity, QoE threshold values indicating when to report, etc. Nevertheless, the AVP needs not be included and in this case all information can be locally defined at PCEF 393. Said QoE measurement activation can apply to all active services or only to a specific service (or set of services) as it is part of PCC rules.

The measurement and reporting can be effected by PCEF 393 as instructed by PCRF 391. As in other disclosed embodiments, various QoE KPI(s) can be measured and reported at the PCEF 393. Examples for suitable KPI(s) include video MOS (Mean Opinion Score), video streaming service accessibility, video streaming service start delay, video streaming re-buffering events and time, video streaming re-buffering failure, video streaming reproduction success rate, web browsing access time, web browsing setup rate, file download access time, file download rate, and the like. In any way, it is to be noted that some end-to-end measurements can also be estimated, so that an actual measurement can be dispensed with.

The above measurement reports can be sent periodically (by means of a local PCEF 393 configured periodicity or controlled by PCRF 391) or only when QoE measured goes out of bounds (by means of a local PCEF 393 configured threshold or controlled by PCRF 391). In order to send a measurement report, the PCEF 393 can trigger a Gx credit control request (CCR) update message including an AVP (possible denomination "QoE-measurement-report") that can well include also several sub-AVPs for indicating the service for which QoE is measured, the QoE itself, etc. A possible implementation may involve to trigger the measurement report to PCRF 391 by setting the event-trigger AVP to an appropriate value (possible denomination "QOE_MEASUREMENT_REPORT").

The control of the communication (enforcement) can then refer to the QoE measurements received from PCEF 393, and the PCRF 391 will communicate to the PCEF 393 the enforcement action to be applied. Typically, the PCRF 391 can re-negotiate network QoS, but also other enforcement actions are again possible, like transcoding or network selection actions.

The stand-alone implementation is one further variant in which the TDF 392 is a stand-alone entity not collocated. Such an implementation may apply to 3GPP Release 11 compliant standalone TDF node which supports the Sd reference point with the PCRF. Such an implementation is similar to the collocated variant described above, but using the Sd interface between the standalone TDF 392 and the PCRF 391. In this way, QoE measurement activation and configuration is the same as the one in collocated variant, but using the Sd reference point instead of Gx:

A corresponding QoE measurement activation could be based on an Sd event trigger (possible denomination "QOE_MEASUREMENT_REPORT"), subscribed from PCRF 391 to standalone TDF 392 dynamically during the session.

In some embodiments, the QoE measurement configuration could be similar to Sd usage monitoring, by extending existing application detection and control (ADC) rules with QoE monitoring (QoE-Monitoring-Key). In order to configure QoE measurements from PCRF 391, an AVP can be employed (possible denomination "QoE-Measurement-Information"), including parameters like reporting periodicity, QoE threshold values indicating when to report, etc. When this AVP is not included all this information can be locally defined at TDF 392.

Also the QoE measurement and reporting is similar to the collocated variant with the exception that the Sd reference point is used instead of Gx.

Based on the QoE measurements received from TDF 392 by means of Sd reference point, the PCRF 391 can communicate the enforcement action to apply either to the TDF 392 or to the PCEF 393 (e.g. GGSN or PGW).

Figure 2A:
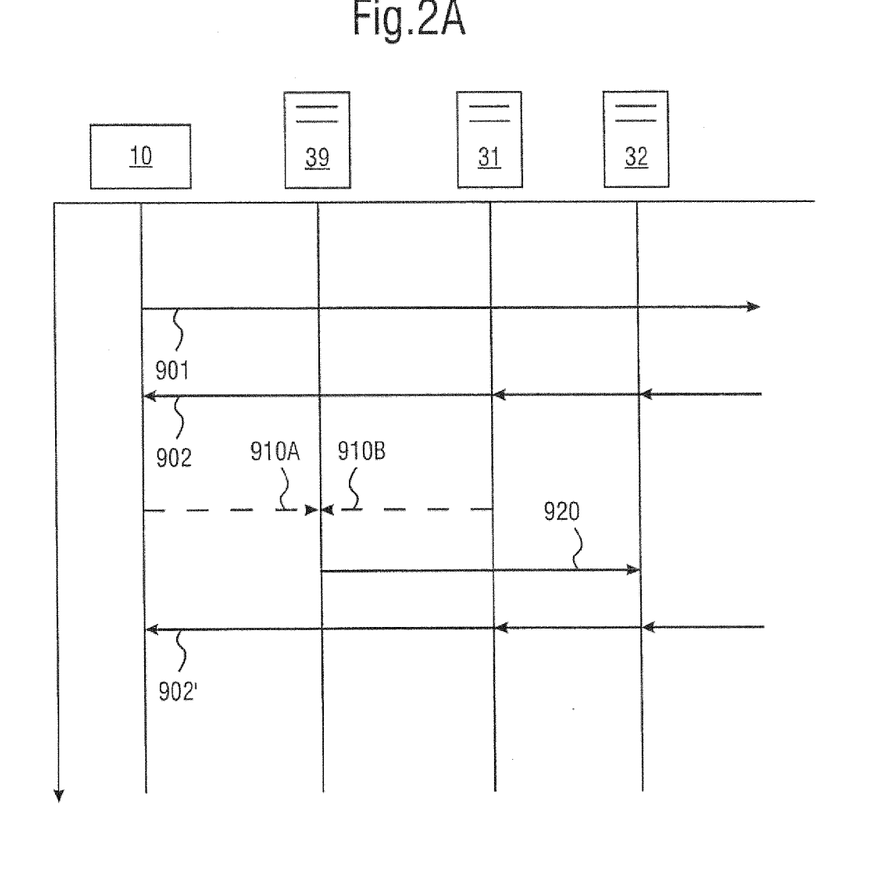
FIGS. 2A and 2B show a schematic view of a procedure carried out amongst involved entities according to further embodiments of the present invention.
Figure 2B:
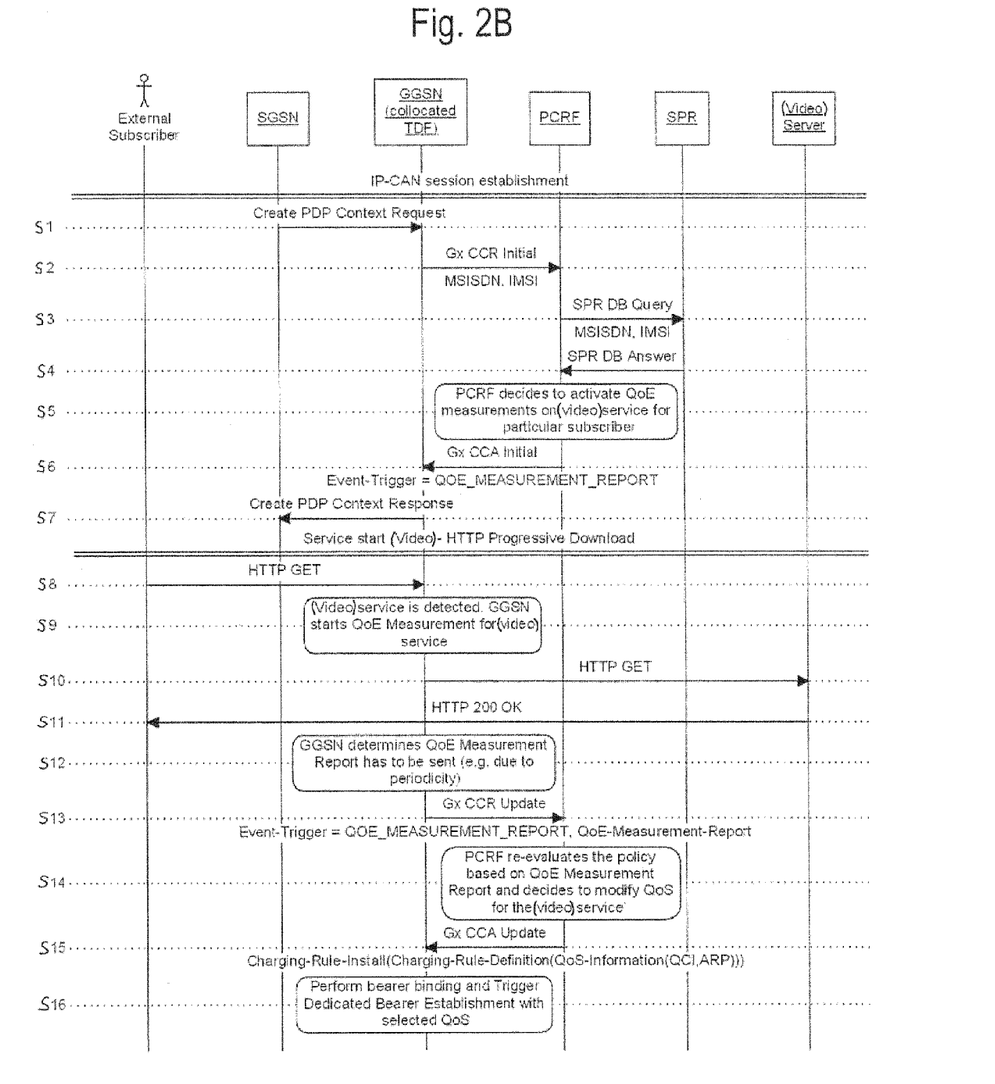

FIG. 2A shows a schematic view of a procedure carried out amongst involved entities according to an embodiment of the present invention. In the shown example, the user terminal 10 transmits a request 901 for communication. Request 901 can be directed to, for example, a video content server. The source (e.g. video content server) provides in response to the request 901 a communication 902.

Information indicative of a QoE concerning communication 902 on the user terminal 10 is conveyed either from the user terminal via 910A to entity 39 or from an entity 31 in a communication path toward user terminal 10 to entity 39. Entity 39 can then control the communication to the user terminal 10 by, for example, instructing network equipment in the communication path, such as entity 32 (node, switch, router, server, etc.). In this way, user terminal 10 receives communication 902' that is controlled based on the information on the QoE 910A and/or 910B.

Again with reference to FIG. 2B, a schematic hand-shake diagram is given for possible signaling amongst the involved entities according to an embodiment of the present invention.

In step S1a "create PDP context request" is sent from the SGSN to the GGSN with a collocated TDF. In step S2 a "Gx CCR initial" possibly including an MSISDN or IMSI is sent from the GGSN to the PCRF. In step S3 an "SPR DB query" possibly including the MSISDN or the IMSI is sent from the PCRF to the SPR. In response, in step S4, an "SPR DB answer" is sent from the SPR to the PCRF. In step S5 the PCRF decides to activate the quality of experience measurements on, for example, a (video) service for a particular subscriber. In step S6, a "Gx CCA initial" is sent from the PCRF to the GGSN. This may involve setting of an event trigger variable "Event-Trigger" to a specific value (possible denomination "QOE_measurement_report"). In step S7 a "create PDP context response" is sent from the GGSN to the SGSN.

Between said step S7 and the next step S8, the service starts, for example by initiating a video HTTP progressive download. In step S8 a "HTTP get message" is sent from the external subscriber to the GGSN. In step S9 the corresponding (for example, video) service is detected. This corresponds to detecting the start of the service that triggers begin of communication control. The GGSN starts the QOE measurement for that (video) service. In step S10 an "HTTP get" is sent from the GGSN to the (video) server, functioning as an exemplary source of the communication. In step S11, a corresponding response is sent back to the external subscriber ("HTTP 200 ok").

In step S12 the GGSN determines that a QOE measurement report has to be sent (e.g. due to a given periodicity or a configured threshold checking). In step S13 a "Gx CCR update" message is sent from the GGSN to the PCRF. This may involve setting an event trigger variable "Event-Trigger" to a specific value (possible denomination "QOE_measurement_report"). In step S14 the PCRF re-evaluates the policy based on QOE measurement report and decides to modify the Quality of Service (QoS) for the specific (video) service. In step S15 a "Gx CCA update" is sent from the PCRF to the GGSN involving a charging rule install with a charging rule definition, e.g. QoS information (QCI, ARP). In step S16 a bearer binding is performed and the dedicated bearer establishment is triggered with the selected QoS.

Figure 3A:
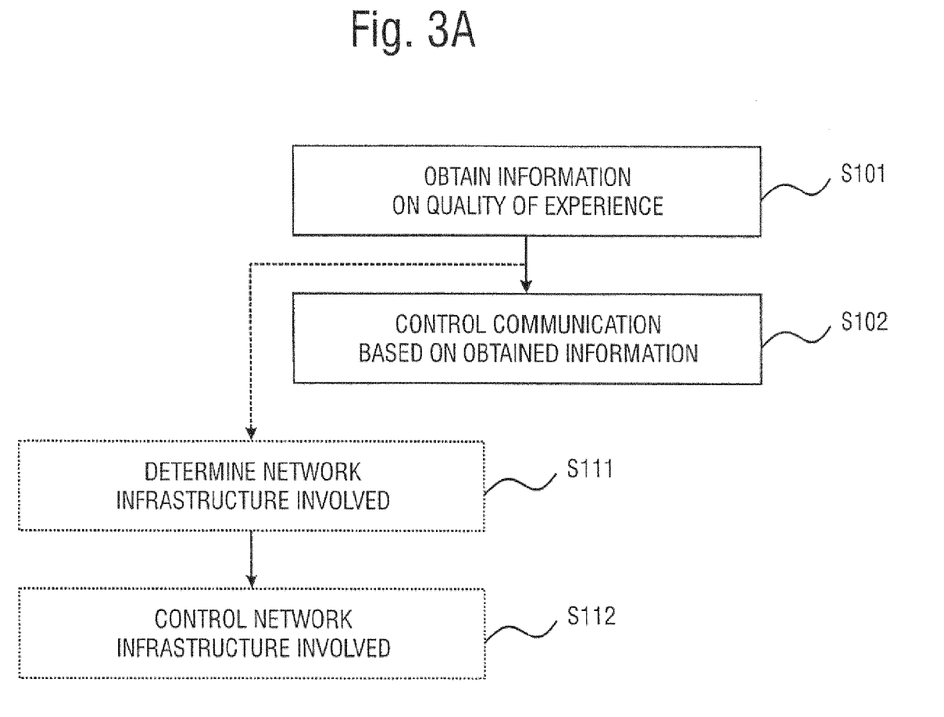
FIGS. 3A and 3B show flow charts of method embodiments of the present invention.

FIG. 3A shows a flow chart of a method embodiment of the present invention. Specifically, this general method embodiment comprises a step S101 of obtaining information indicative of a quality of experience on a user terminal in communication with the communication network. The method further comprises a step S102 of controlling the communication to the user terminal based on the obtained information indicative of a quality of experience.

Optionally, this embodiment comprises a step S111 of determining network infrastructure involved, i.e. entities in the communication path toward the user terminal or entities handling the communication (node, switch, router, server, etc.), and—also optionally—as step S112 of controlling the determined infrastructure so as to provide a desired QoE. In this way, a feedback control of ensuring a given QoE on the user terminal can be implemented. This method can be performed by one or more network entity/entities for use in a communication network.

Figure 3B:
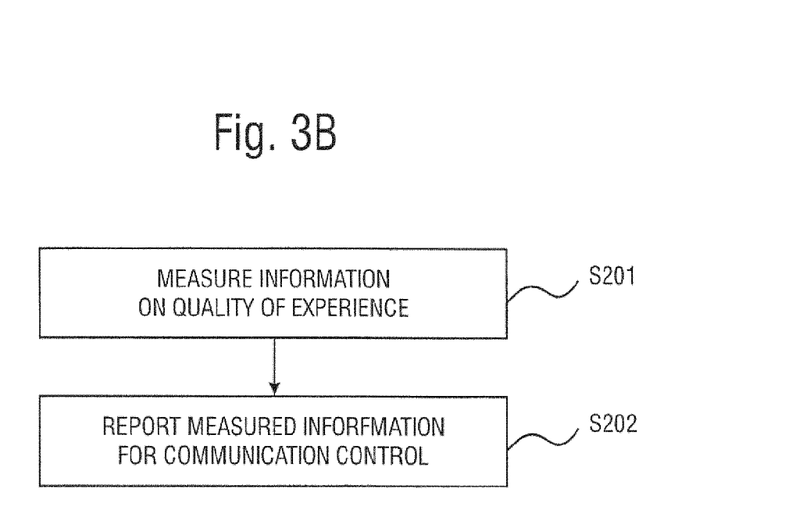

FIG. 3B shows a flow chart of a method embodiment of the present invention. Specifically, this general method embodiment comprises a step S201 of measuring information on quality of experience and a step S202 of report the measured information for communication control. As a further embodiment, steps S201 and S202 can be implemented before or in place of step S101 as described in conjunction with FIG. 3A.

Figure 4:
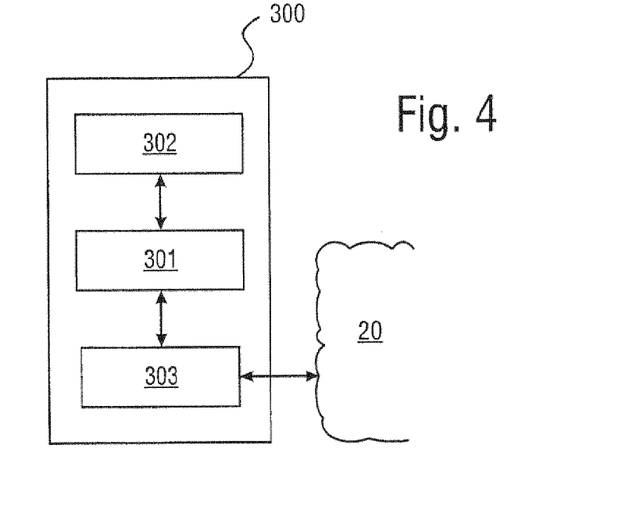
FIG. 4 shows a schematic view of a network entity according to yet a further embodiment of the present invention.

FIG. 4 shows a schematic view of a network entity according to a further embodiment of the present invention. The entity 300 is able to provide one or more functionalities of embodiments of the present invention and thus comprises a processing resource 301, such as a processing unit, memory resources 302, such as a memory and/or a data storage, and communication resources 303, such as a communication unit/interface, so as to be able to communicate and exchange information with network 20. The resources 301, 302, 303 may be collocated in one unit, such as a server, a computer or a processor board, but they may also well be distributed over a network or a data center.

For the entity 300 providing the one or more functionalities of embodiments of the present invention, the processing resource 301 executes code, instructions, applications, or programs that are stored in the memory resources 302. The involved data may also be retrieved from other locations over network 20 via the communication resources 303.

The embodiments of the present invention are specifically able to provide one or more of the below advantages. Firstly, a new service to subscribers can be provided, where the network automatically optimizes user QoE. Not perceiving the right QoE can cause subscriber insatisfaction and therefore subscriber churn. Further, a mechanism can be provided to operators to guarantee a specified level of service as well as a means for controlling network congestion (e.g. video codec adaptation changes) while not degrading the perceived QoE for certain services or certain subscribers (e.g. premium video users). Yet further, the proposed mechanism can be integrated in existing 3GPP PCC architectures and can apply both on a per subscriber and on a per service basis.

Although detailed embodiments have been described, these only serve to provide a better understanding of the invention defined by the independent claims, and are not to be seen as limiting.

The invention claimed is:

1. A first computer server for use in a telecommunications network, the first computer server comprising:
a processor;
a network communication interface; and
a memory coupled to the processor and comprising computer readable program code that when executed by the processor causes the processor to perform operations to:
receive, via the network communication interface, a first Diameter credit control request (CCR) identifying a user terminal in the telecommunications network;
retrieve subscription information corresponding to the identified user terminal;
responsive to a determination that the subscription information of the user terminal supports performance monitoring, initiate performance monitoring of the user terminal by transmitting, via the network communication interface, a key performance indicator measurement request to a second computer server in the telecommunications network in a communication path towards the user terminal and separate from the user terminal,
wherein the key performance indicator measurement request comprises a Diameter credit control answer (CCA) responsive to the first Diameter CCR that includes a first attribute value pair (AVP) comprising parameters for configuration of the performance monitoring;
responsive to sending the key performance indicator measurement request to the second computer server, receive from the second computer server a key performance indicator measurement for the user terminal via the network communication interface,
wherein the key performance indicator measurement is received as a second AVP within a second Diameter CCR; and
control the communication to the user terminal based on the key performance indicator measurement by instructing network equipment in the communication path toward the user terminal to apply a specific quality of service policy.

2. The first computer server according to claim 1, wherein the second computer server is any of a policy and charging enforcement function (PCEF), a traffic detection function (TDF), and Bearer Binding and Event Reporting Function (BBERF).

3. The network-entity first computer server according to claim 1, wherein the key performance indicator measurement is received in response to a change in network parameters.

4. The first computer server according to claim 1, wherein the report key performance indicator measurement is received in response to the key performance indicator measurement exceeding a preset threshold or falling below a preset threshold.

5. The first computer server according to claim 1, wherein the processor is configured to start the control of the communication upon a triggering event or responsive to receiving a user request.

6. The first computer server according to claim 1, wherein the processor is part of a policy and charging rules function (PCRF).

7. The first computer server according to claim 6, wherein the processor is configured during control of the communication to communicate an enforcement action to a policy and charging enforcement function (PCEF).

8. The first computer server according to claim 7, wherein the enforcement action comprises any one of a control of trans-coding and a modification of a cell reselection policy.

9. The first computer server according to claim 1, wherein the processor is configured to initiate performance monitoring of the user terminal by transmitting the key performance indicator measurement request responsive to identifying a threshold change in network quality of service (QoS) parameters.

10. A second computer server for use in a telecommunications network, the second computer server comprising:
a processor;
a network communication interface; and
a memory coupled to the processor and comprising computer readable program code that when executed by the processor causes the processor to perform operations to:
transmit, via the network communication interface, a first Diameter credit control request (CCR) identifying a user terminal in communication with the telecommunication network to a first computer server in the telecommunications network;
receive, via the network communication interface, a key performance indicator measurement request from the first computer server to begin performance monitoring of the user terminal,
wherein the key performance indicator measurement request comprises a Diameter credit control answer (CCA) responsive to the first Diameter CCR that includes a first attribute value pair (AVP) comprising parameters for configuration of the performance monitoring;
measure a key performance indicator measurement for the user terminal; and
transmit, via the network communication interface, the key performance indicator measurement to the first computer server for controlling the communication to the user terminal based on the obtained key performance indicator measurement,
wherein the key performance indicator measurement is transmitted as a second AVP within a second Diameter CCR.

11. The second computer server according to claim 10, wherein the processor is part of a policy and charging enforcement function (PCEF).

12. The second computer server according to claim 11, wherein the first computer server is a policy and charging rules function (PCRF).

13. The second computer server according to claim 10, wherein the processor is configured to transmit the key performance indicator measurement in response to the key performance indicator measurement exceeding a preset threshold or falling below a preset threshold.

14. A method of operating a first computer server for use in a telecommunications network, the method comprising:
receiving, via a network communication interface of the first computer server, a first Diameter credit control request (CCR) identifying a user terminal in the telecommunications network;
retrieving subscription information corresponding to the identified user terminal;
responsive to a determination that the subscription information of the user terminal supports performance monitoring, initiating performance monitoring of the user terminal by transmitting, via the network communication interface, a key performance indicator measurement request to a second computer server in the telecommunications network in a communication path towards the user terminal and separate from the user terminal,
wherein the key performance indicator measurement request comprises a Diameter credit control answer (CCA) responsive to the first Diameter CCR that includes a first attribute value pair (AVP) comprising parameters for configuration of the performance monitoring;
responsive to sending the key performance indicator measurement request to the second computer server, receiving from the second computer server a key performance indicator measurement for the user terminal via the network communication interface,
wherein the key performance indicator measurement is received as a second AVP within a second Diameter CCR; and
controlling the communication to the user terminal based on the key performance indicator measurement by instructing network equipment in the communication path toward the user terminal to apply a specific quality of service policy.

15. The method of claim 14, further comprising starting the control of the communication upon a triggering event or responsive to receiving a user request.

16. The method according to claim 14, wherein initiating performance monitoring of the user terminal by transmitting the key performance indicator measurement request is further responsive to identifying a threshold change in network quality of service (QoS) parameters.

17. The method according to claim 14, wherein the Diameter CCA is a first Diameter CCA, and
wherein controlling the communication to the user terminal based on the key performance indicator measurement is performed by transmitting, via the network communication interface, a second Diameter CCA responsive to the second Diameter CCR that includes the key performance indicator measurement.

18. A method of operating a second computer server for use in a telecommunications network, the method comprising:
transmitting, via a network communication interface of the second computer server, a first Diameter credit control request (CCR) identifying a user terminal in communication with the telecommunication network to a first computer server in the telecommunications network;
receiving, via the network communication interface, a key performance indicator measurement request from the first computer server to begin performance monitoring of the user terminal,
wherein the key performance indicator measurement request comprises a Diameter credit control answer (CCA) responsive to the first Diameter CCR that includes a first attribute value pair (AVP) comprising parameters for configuration of the performance monitoring;
measuring a key performance indicator measurement for the a user terminal; and transmitting via the network communication interface the key performance indicator measurement to the first computer server for controlling the communication to the user terminal based on the obtained key performance indicator measurement, wherein the key performance indicator measurement is transmitted as a second AVP within a second Diameter CCR.

19. A computer program product comprising a non-transitory computer readable storage medium storing program code executable by the processor of the first computer server to cause the first computer server to operate according to claim 1.

20. A computer program product comprising a non-transitory computer readable storage medium storing program code executable by the processor of the second computer server to cause the second computer server to operate according to claim 10.

* * * * *